United States Patent
Stroman

[15] 3,701,280
[45] Oct. 31, 1972

[54] METHOD AND APPARATUS FOR DETERMINING THE SUPERCOMPRESSIBILITY FACTOR OF NATURAL GAS

[72] Inventor: Larry J. Stroman, Houston, Tex.
[73] Assignee: Daniel Industries, Inc., Houston, Tex.
[22] Filed: March 18, 1970
[21] Appl. No.: 20,606

[52] U.S. Cl. .................. 73/194 M, 73/23, 73/30, 73/231 M, 73/206
[51] Int. Cl. .............................................. G01f 1/00
[58] Field of Search ............ 73/194 M, 231 M, 23, 30

[56] References Cited

UNITED STATES PATENTS 3,248,942  5/1966  Cole ............................. 73/231
3,537,312  11/1970 Moore ........................... 73/231
3,555,901  1/1971  Delatorre .................... 73/197

OTHER PUBLICATIONS

Introduction to D. C. Analog Computers, Korn et al. 1956 Sci. Lib. No. QA76.4K6 pp. 13, 253, 425
Par Research Project NX–19, 1962 pp. 1–4

Primary Examiner—Richard C. Queisser
Assistant Examiner—Marvin Smollar
Attorney—Arnold, White & Durkee, John G. Graham and Darryl M. Springs

[57] ABSTRACT

In one exemplar embodiment, an electrical circuit for deriving an electrical signal representative of the square of the supercompressibility factor of natural gas by providing means for measuring the static pressure of the gas, multiplying the static pressure measurement by predetermined functions of pressure, temperature and specific gravity for a preselected range of operation and adding a predetermined constant factor, approaching unity, to the product of the pressure and functions of pressure, temperature and specific gravity.

20 Claims, 5 Drawing Figures

Larry J. Stroman
INVENTOR

BY
Arnold, White & Durkee
ATTORNEYS

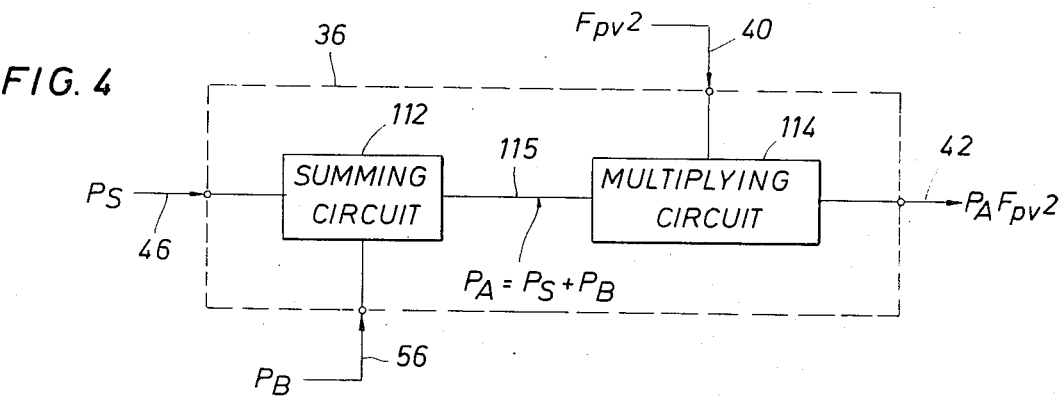
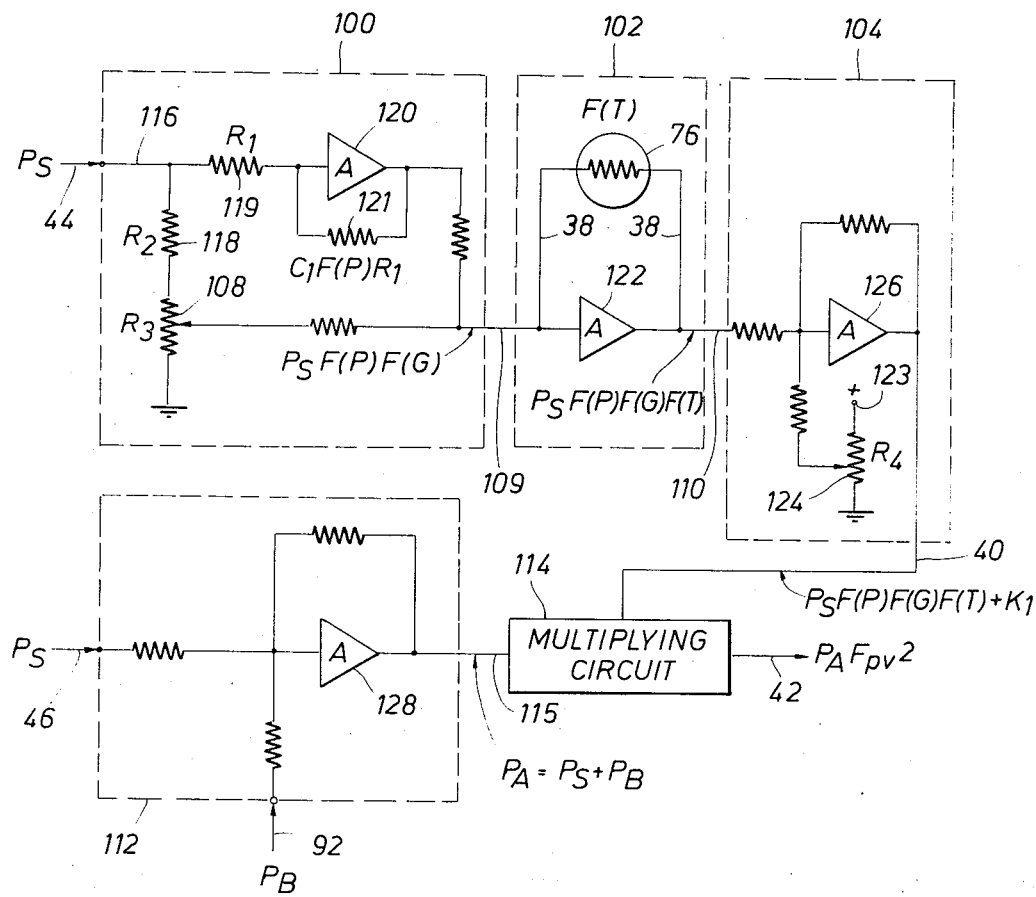
FIG. 4
FIG. 5

METHOD AND APPARATUS FOR DETERMINING THE SUPERCOMPRESSIBILITY FACTOR OF NATURAL GAS

BACKGROUND OF THE INVENTION

The measurement of the flow of natural gas by either orifice or positive displacement techniques is complicated by a phenomena called "supercompressibility." A development of the general hydraulic flow equation for calculating the quantity of the flow of natural gas involves the actual specific weight of the fluid at the point of measurement, and in the measurement of gas this depends upon the flowing pressure and temperature. To translate the calculated volume of the flowing pressure and temperature of the gas to a base pressure and base temperature, it is customary to apply the law for an ideal gas. All gases deviate from this ideal gas law to a greater or lesser extent. This deviation has been termed by the industry as "supercompressibility." A factor to take account of this supercompressibility of gases is necessary in the measurement of gases under some conditions. This factor is particularly appreciable at high pressures.

The supercompressibility factor is rather complicated to determine, since it is a function of three variables: pressure, temperature and specific gravity. The complexity of this function has resulted in a lack of methods and equipment to automatically make the supercompressibility correction in the measurement and computation of the quantity of the flow of gas. In some applications, it is possible to program an average value of the supercompressibility factor into the flow computer. However, where the pressure, temperature and specific gravity variables cover a wide range, such an average factor is not particularly useful. As a result, in many applications where a flow computer is otherwise desirable, it cannot be used due to the lack of a technique or circuitry to make an automatic correction for supercompressibility.

The present invention remedies the problems of the prior art by providing a method and apparatus for automatically compensating for supercompressibility over preselected ranges of pressure, temperature and specific gravity. It is applicable to both orifice measurement and actual volume measurement of gases. The correction factor is basically a curve fit, over a limited range, of the data listed in American Gas Association (AGA) PAR Research Project NX-19 (1963). It is not possible to develop a linear equation which will accurately express a supercompressibility factor over wide ranges of the variables affecting it. The expression of the supercompressibility factor as an equation herein is applicable over limited ranges. However, certain of the functions and constants would have to be selected dependent upon the preselected ranges of operation.

SUMMARY OF THE INVENTION

The invention herein provides a novel apparatus and method for providing a supercompressibility correction factor applicable over preselected ranges of pressure, specific gravity and temperature. Broadly, the invention involves the determination of preselected functions of pressure, temperature and specific gravity and multiplying these functions by the measured static pressure of the flowing gas. Then a preselected constant is added to derive the squared value of the supercompressibility factor of the gas.

By summing the measured static pressure with true barometric pressure, absolute pressure may be obtained, and, when multiplied by the squared value of the supercompressibility factor earlier obtained, a total correction factor may be applied to conventional gas flow computers for correcting the measurement of gas flow and automatically taking into account the supercompressiblity factor over the preselected ranges of pressure, temperature and specific gravity.

An analog circuit has been devised to accomplish the determination of the supercompressibility correction factor for preselected ranges of pressure, temperature and specific gravity. The circuit receives measured static gauge pressure as an electrical signal, and multiplies the pressure signal by predetermined values of the function of pressure and specific gravity, and by a variable function of temperature. In addition, a summing circuit adds a predetermined constant to the product of pressure and functions of pressure, temperature and specific gravity for generating an electrical signal representative of the squared value of the supercompressibility factor.

Electrical signals representative of the static gauge pressure and true barometric pressure are applied as inputs to a conventional summing circuit to generate an electrical signal representative of absolute pressure, which in turn is multiplied by the previously obtained signal representing the squared value of the supercompressibility factor. The multiplied output signal is then applicable to gas flow computers utilized in orifice and positive displacement measurement installations.

Accordingly, one primary feature of the present invention is to provide a method for automatically deriving a supercompressibility correction factor that may be directly applied to existing gas flow computers for correcting the gas flow measurements for supercompressibility over selected ranges of pressure, temperature and specific gravity.

Another feature of the present invention is to provide circuitry for automatically generating electrical signals representative of a function of the supercompressibility factor for application to conventional gas flow computers.

Yet another feature of the present invention is to provide the necessary circuitry for automatic correction of gas supercompressibility in order that conventional gas flow computer techniques may be used in applications where previously not feasible because of the wide variation in supercompressibility.

Another feature of the present invention is to provide method and means for providing an automatic correction term for supercompressibility of a gas that may be equally applicable to flow measurement computations of gas utilizing orifice or positive displacement techniques.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 4 is a functional block diagram of a summing and multiplying circuit for multiplying the squared supercompressibility factor by absolute pressure for use as a correction term in a gas flow computer.

FIG. 5 is a detailed electrical schematic diagram of one embodiment of the invention herein for deriving a signal representative of the correction factor for correcting gas flow computer measurements for supercompressibility.

DETAILED DESCRIPTION OF THE PREFERRED EMBODIMENTS

Figure 1:
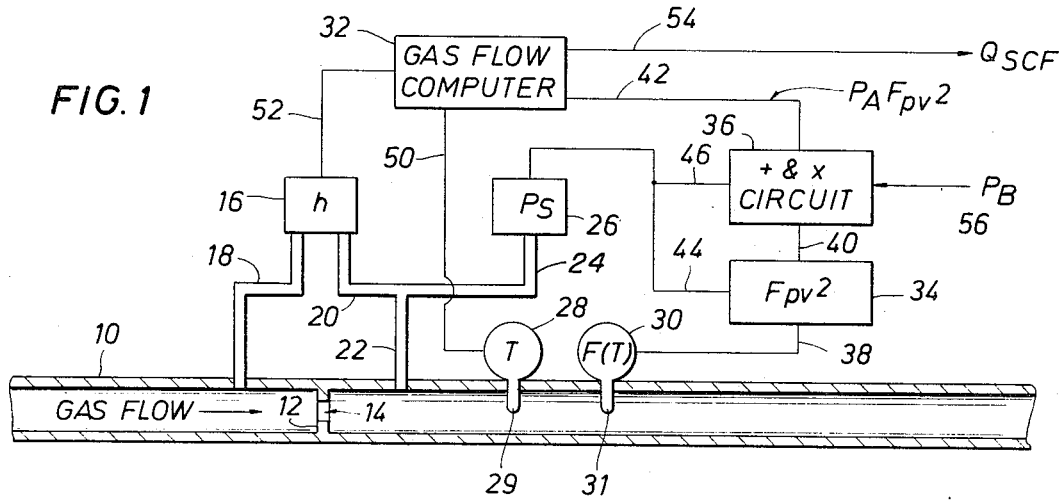
FIG. 1 is a partial pictorial and functional block diagram showing the measurement of gas flow utilizing an orifice meter and including the circuitry of the present invention for correcting for supercompressibility.

In the measurement of gases, and most especially natural gases, the most common form of measurement is by utilizing orifice metering and the calculation of the flow rate of gas in standard units, i.e., standard cubic feet. A common form of the gas orifice flow equation is:

$$Q_{SCF} = C' \sqrt{(hP_A/T)} \quad (1)$$

where:
$Q_{SCF}$ = the measured flow rate of the gas in standard units (standard cubic feet)
$C'$ = quasi-constant containing numerous factors including the supercompressibility factor $F_{pv}$
$h$ = differential pressure across the orifice plate opening
$T$ = absolute temperature of the flowing gas
$P_A$ = absolute pressure of the gas The orifice flow constant $C'$ may be defined as the rate of flow in cubic feet per hour, at base conditions, when the extension of the square root of $h$ times $P = 1$. $C'$ is generally defined as follows:

$$C' = F_b F_r Y F_{pb} F_{tb} F_{tf} F_g F_{pv} F_m F_a F_e \quad (2)$$

where:
$F_b$ = basic orifice factor
$F_r$ = Reynolds number factor
$Y$ = expansion factor
$F_{pb}$ = pressure base factor
$F_{tb}$ = temperature base factor
$F_{tf}$ = flowing temperature factor
$F_g$ = specific gravity factor
$F_{pv}$ = supercompressibility factor
$F_m$ = manometer factor (mercury type meters)
$F_a$ = orifice thermal expansion factor
$F_e$ = gauge location factor (mercury type meters)

The values of all of the factors, including $F_{pv}$, may be obtained from publications such as the "Orifice Metering of Natural Gas — Gas Measurement Committee Report No. 3 (Rev. 1969)," published by the American Gas Association, Inc. The values of $F_{pv}$ are more extensively defined over wide ranges of pressure and temperature in the "Manual for the Determination of Supercompressibility Factors for Natural Gas" PAR Research Project NX-19 of the American Gas Association. However the values of $F_{pv}$ vary widely for varying combinations of pressure, temperature and specific gravity, and in practice an average factor is utilized which is only applicable for a given specific gravity, temperature and pressure.

It may be seen that the basic gas orifice flow equation could be rewritten as follows:

$$Q_{SCF} = CF_{pv}\sqrt{h\frac{P_A}{T}} \quad (3)$$

or $$Q_{SCF} = C\sqrt{\frac{h}{T}P_A F_{pv}^2} \quad (4)$$

where:
$C$ = quasi-constant defined in equation (2) above but excluding $F_{pv}$ as a factor
$Q_{SCF}$, $h$, $P_A$ and $T$ are identical factors defined in equation (1) above.

Actual volume measurements made by turbine meters or positive displacement meters calculate volume measurements directly in actual cubic feet passing through the meter. Such actual volume measurements are converted to standard volume measurements by the following equation:

$$Q_{SCF} = Q'_{ACF}(P/T)F_{pv}^2 \quad (5)$$

where:
$Q'_{ACF}$ = the measured flow rate of the gas in actual units (actual cubic feet)
$Q_{SCF}$, $P_A$, $T$ and $F_{pv}^2$ are identical factors defined in equations (1) through (4) above.

By reviewing equations (4) and (5) above, it may be seen that the term which is common to the solution of the volume measurements in standard cubic feet in both equations is the term $P_A F_{pv}^2$. If this term could be derived in this form it may be used in the gas orifice flow equation and in the conversion of actual volume measurements made by positive displacement meters to standard volume measurements.

Therefore, the invention entails the computation of $P_A f_{pv}^2$ rather than a direct computation of $F_{pv}$. The reason for this is as above stated, in that $P_A f_{pv}^2$ is used in converting actual cubic feet measurements to standard cubic feet measurements. In addition, the squared function of $F_{pv}$ is not a handicap in orifice measurement, since it can be conveniently inserted into the gas flow computer and its square root extracted at the same time the square root is extracted of other variables in the flow equation. In addition, it makes computation of the factor $F_{pv}$ less critical.

Accordingly, the following equation was derived:

$$F_{pv}^1 = P_s F(P)F(G)F(T) + K_1 \quad (6)$$

where:
$P_s$ = static gauge pressure of the flowing gas
$F(P)$ = a predetermined pressure function, optimized for the selected operating ranges of pressure, temperature and specific gravity $F(G)$ = a predetermined gravity function, optimized for the selected operating ranges of pressure, temperature and specific gravity $F(T)$ = a predetermined temperature function, optimized for the selected operating ranges of pressure, temperature and specific gravity $K_1$ = a predetermined constant, approximately unity, and optimized for the selected operating ranges of pressure, temperature and specific gravity.

To illustrate the derivation of the various functions of pressure, temperature and specific gravity that must be made for the selected range of pressure, temperature and specific gravity, an example will be utilized.

EXAMPLE

Assume a gas being measured has a specific gravity ranging from 0.56 to 0.64, temperatures ranging from 30° to 90° F, and pressures ranging from 500 to 900 psi. Utilizing the above information, and the "Manual for the Determination of Supercompressibility Factors for Natural Gas," PAR Research Project NX-19, published by the American Gas Association, the following table may be constructed based on the average specific gravity, 0.60.

TABLE I $F_{pv}^2$ For Example Operating Ranges of T, P and G (Base) Average Specific Gravity 0.60

| Pressure psi | 30°F | 60°F | 90°F |
|---|---|---|---|
| 500 | 1.1069 | 1.0843 | 1.0675 |
| 600 | 1.1310 | 1.1023 | 1.0814 |
| 700 | 1.1561 | 1.1208 | 1.0952 |
| 800 | 1.1820 | 1.1393 | 1.1090 |
| 900 | 1.2085 | 1.1580 | 1.1228 |

$F(P)$ is predetermined multiplying pressure function optimized for the range of pressure, temperature and specific gravity selected. For the range of values given above, and as shown in Table I, 60° F is the average temperature in the 30° to 90° F range. $F(P)$ is then defined as the change in $F_{pv}^2$ per one psi change in pressure at the average specific gravity of 0.60 and the average temperature of 60° F. To determine $F(P)$ over the 500–900 psi range selected, the values for the differences in $F_{pv}^2$ between 500–600 psi, between 600–700 psi, between 700–800 psi, and the difference between 800–900 psi would be averaged, and that average value determines $F(P)$. Accordingly, $F(P)$ may be calculated as follows:

$F(P)_{100\ psi} = (0.0180 + 0.0185 + 0.0185 + 0.0187)/4$ $F(P)_{100\ psi} = 0.01842$ $F(P)_{1\ psi} = 0.0001842$ Since $F(P)$ has been calculated at the average specific gravity and the average temperature over the range selected, we will, by definition, assign the value of 1.0000 to $F(G)$ and $F(T)$ at the base or average specific gravity and temperature respectively. Accordingly, equation (6) may be expressed as follows:

$$F_{pv}^2 = P_S(0.0001842)(1.0000)(1.0000) + K_1 \quad (7)$$
$$= (0.0001842)P_S + K_1$$

$K_1$ may now be calculated at the average pressure, 700 psi, of the range of pressures from 500 to 900 psi. Substituting the appropriate values from Table I into equation (7) above, $K_1$ may be calculated as follows:

$1.1208 = (0.0001842)(700) + K_1$ $K_1 = 1.1208 - 0.1289$ $= 0.9919$

The validity of the calculation of $F(P)$ and $K_1$ may be checked at another pressure, say 500 psi, as follows:

$F_{pv}^2\ 500 = (0.0001842)(1.0000)(1.0000)(500) + 0.9919$ $= 0.0921 + 0.9919$ $= 1.0840$

The value in Table I for $F_{pv}^2$ at 60° F at 500 psi is 1.0843, and the above calculated value differs from the actual value by approximately 0.03 percent, an acceptable deviation in gas flow measurement.

The values of $F(T)$ and $F(G)$ may be calculated in a similar fashion to the above calculation for $F(P)$ by calculating the differences in $F_{pv}^2$ for discrete increments of change in temperature and specific gravity over the range of temperatures and specific gravity given.

However, another technique may be used to solve for $F(T)$ or $F(G)$. The following equation is basic equation (6) above:

$$F_{pv}^2 = P_S F(P) F(T) F(G) + K_1$$

transposing terms, $$F_{pv}^2 - K_1 = P_S F(P) F(G) (T)$$

but at base conditions, $$P_S F(P) F(G) = F_{pv\,(base)}^2 - K_1$$

therefore, $F$ may readily be calculated at any point as follows:

$$F(T)_{calc.} = \frac{F_{pv(calc)}^2 - K_1}{F_{pv(base)}^2 - K_1} \quad (8)$$

In the example above, 60° F was the base temperature. Therefore, to calculate $F(T)$ for 30°F the appropriate $F_{pv}^2$ values may be extracted from Table I, and, using the previously calculated value of $K_1$:

$$F(T)_{30°F.} = \frac{F_{pv30°F.}^2 - K_1}{F_{pv60°F.}^2 - K_1}$$

$$= \frac{1.1561 - 0.9919}{1.1208 - 0.9919}$$

$$= \frac{0.1642}{0.1289}$$

$$= 1.2738$$

Similarly, assuming 0.60 is the base gravity, $F(G)$ may be calculated for other values of specific gravity by utilizing a formula similar to that shown above, as follows:

$$F(G)_{calc} = \frac{F_{pv(calc)}^2 - K_1}{F_{pv(base)}^2 - K_1} \quad (9)$$

From the above, it is apparent that various values for $F(P)$, $F(T)$ and $F(G)$ may be calculated for the preselected range of pressure, temperature and specific gravity under consideration.

Referring now to FIG. 1, a typical equipment setup for use in orifice metering of gas is shown. The gas is flowing in pipe 10 in the direction shown by the arrow and moves through a plate 12 having an orifice 14. A differential pressure transducer 16 is connected to both the upstream and downstream sides of the orifice plate 12 via tubing 18, 20, and 22, respectively, and generates an electrical signal representative of the differential pressure. The differential pressure signal is applied to gas flow computer 32 via conductor 52.

At the same time, the downstream static gauge pressure of the gas is being measured by a static pressure transducer 26 connected to the downstream flow of the gas in pipe 10 via tubing 24 and 22. A temperature transducer 28, having a temperature probe 29 inserted into the gas flow, continuously monitors the temperature of the flowing gas and, via conventional transducer circuitry, generates an electrical signal representative of the temperature of the gas. The electrical signals representative of the static pressure measured by transducer 26 is applied via conductors 44 and 46 to a circuit 34 for calculating the squared value of supercompressibility ($F_{pv}^2$) and to an adding and multiplying circuit 36, respectively.

A second temperature transducer 30 having a probe 31 continuously monitoring the temperature of the flowing gas generates an electrical signal representative of the values of $F(T)$ over the range of temperature to be measured. This may be accomplished through conventional thermister circuitry and the electrical signal is applied via conductor 38 as an input to the supercompressibility factor circuit 34. The $F_{pv}^2$ output of circuit 34 is applied via conductor 40 to the adding and multiplying circuit 36.

Static pressure, $P_S$, is converted to absolute pressure, $P_A$, by he addition of barometric pressure $P_B$ in circuit 36. A signal representing barometric pressure $P_B$ is applied to circuit 36 via conductor 56. Barometric pressure may be measured by any conventional means to derive a signal representative thereof. After the static pressure $P_S$ has been converted to absolute pressure $P_A$, the absolute pressure is then multiplied by the applied input of $F_{pv}^2$ to generate an output equal to the absolute pressure multiplied by the squared value of the supercompressibility factor ($P_A F_{pv}^2$) which is then applied as an electrical input signal to the gas flow computer 32 via conductor 42. Utilizing well known computer technology, gas flow computer 32 utilizes the differential pressure signal applied via conductor 52, gas temperature signal applied in via conductor 50, and the value of $P_A F_{pv}^2$ applied in via 42, and with other preset values predetermined to define the orifice flow constant as shown in equation (2) above, the gas flow in standard units may be calculated. An electrical signal representative of the gas flow in standard units $Q_{SCF}$, is generated and applied via conductor 54 to appropriate recording and display equipment (not shown).

Figure 2:
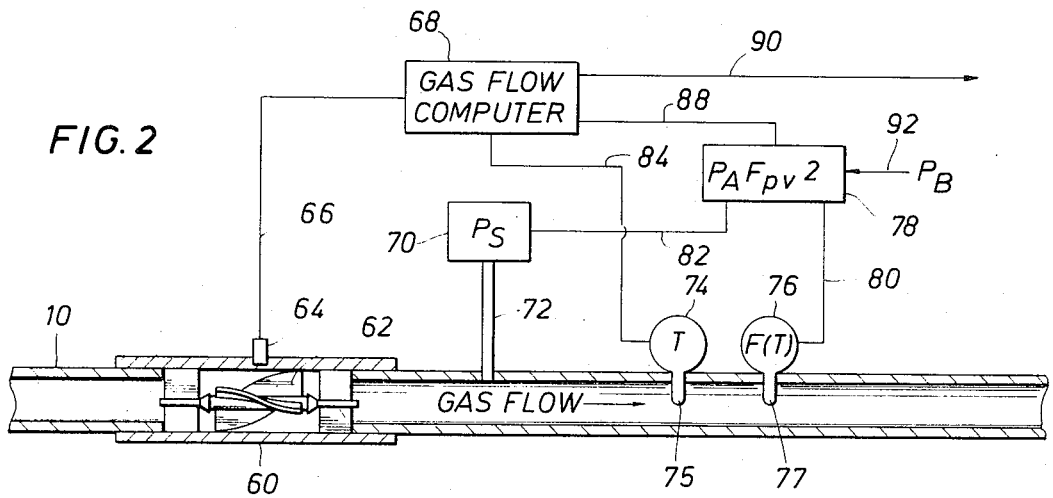
FIG. 2 is a partial pictorial and functional block diagram showing the circuitry utilized in computing gas flow utilizing a positive displacement meter and including the circuitry of the present invention for correcting the supercompressibility.

In FIG. 2, gas is flowing in pipe 10 in the direction shown by the arrow and is being metered by a gas turbine meter 60 having a rotor 62 that rotates axially as the gas flows through the meter and exerts force on the blades of the rotor. A detector 64 detects the number of rotations of rotor 62 and causes a series of discrete pulses to be induced in detector 64 and applied via conductor 66 to the gas flow computer 68. The number of pulses generated by turbine meter 60 and applied via conductor 66 are proportional to the actual quantity of gas moving through meter 60.

A static pressure transducer 70 monitors the pressure of the gas flowing in pipe 10 through tubing 72 and generates a signal proportional to the gauge pressure so measured and applied via conductor 82 as an input to circuit 78 for calculating the combined correction factor of absolute pressure multiplied by the squared value of the supercompressibility factor ($P_A F_{pv}^2$). A temperature transducer 74 having a temperature probe 75 injected into the gas stream continuously measures the temperature of the flowing gas and utilizing conventional circuitry, generates an electrical signal representative of the temperature of the gas applied via conductor 84 as another input to the gas flow computer 68.

A second temperature measuring device 76 having a probe 77 disposed in the gas flow for continuously monitoring the gas temperature utilizes conventional thermister circuitry to generate an electrical signal representative of $F(T)$ over the range of pressure, temperature and specific gravity selected. The electrical signal representative of $F(T)$ is applied via conductor 80 as an input to the $P_A F_{pv}^2$ calculating circuit 78. A signal representing pressure P is applied via conductor 92 as another input to circuit 78 for converting static gauge pressure $P_S$ to absolute pressure $P_A$ as hereinabove previously described.

The $P_A F_{pv}^2$ output of circuit 78 is applied via conductor 88 as an input to gas flow computer 68, where utilizing conventional computing technology and circuitry, the flow in actual cubic feet is converted to a standard measurement of flow, $Q_{SCF}$. The standard volume measurement $Q_{SCF}$ is represented by an electrical signal applied via conductor 90 to counting and/or visual display equipment (not shown).

Figure 3:
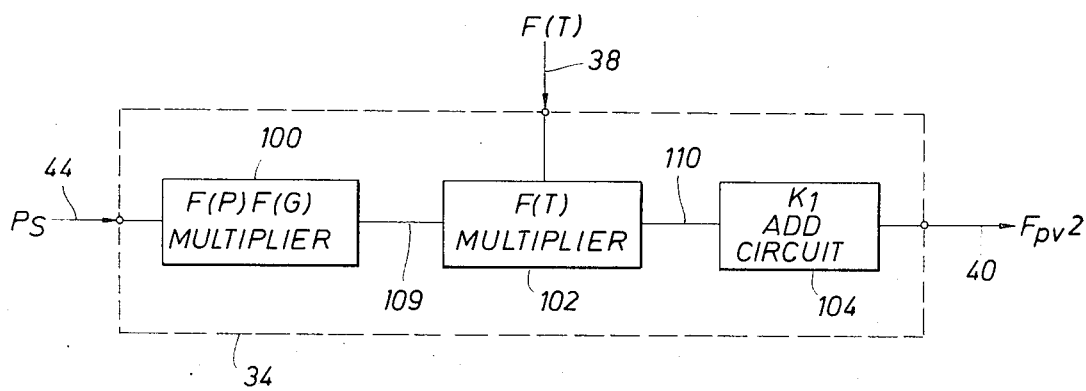
FIG. 3 is a functional block diagram of the circuitry for deriving the squared supercompressibility factor of the gas.

FIGS. 3 and 4 are functional block diagrams of the $F_{pv}^2$ circuit 34 and the adding and multiplying circuit 36 shown in FIG. 1, and the $P_A F_{pv}^2$ circuit 78 is shown in FIG. 2. In FIG. 3, the $F_{pv}^2$ circuit 34 is shown in functional block schematic form with static pressure $P_S$ being applied as an input via conductor 44 to an $F(P)F(G)$ multiplier 100. The multiplied output of circuit 100 is applied via conductor 109 as an input to the $F(T)$ multiplier 102, with the variable input $F(T)$ being applied as an input via conductors 38 from the $F(T)$ transducer 30 (see FIG. 1). The multiplied output of circuit 102 is applied via conductor 110 to a summing circuit 104 in which the term $K_1$ is added to the product of $P_S F(P) F(G) F(T)$.

The calculated value of $F_{pv}^2$ is then applied via conductor 40 to a conventional analog multiplying circuit 114 within adding and multiplying circuit 36. Electrical signals representative of the static gauge pressure $P_S$ are applied via conductor 46 as one input to a conventional summing circuit 112. The other input of summing circuit 112 is an electrical signal representative of barometric pressure $P_B$ applied via conductor 56. The summed barometric and static pressure values equal absolute pressure $P_A$ and an electrical signal representative of $P_A$ is applied via conductor 115 as an input to multiplying circuit 115 to be multiplied by the $F_{pv}^2$ input applied via conductor 40. An output is generated at conductor 42 is equal to the product of absolute pressure times the square of the supercompressibility factor ($P_A F_{pv}^2$).

FIG. 5 is a detailed schematic diagram of the $F_{pv}^2$ circuit 34 and the adding and multiplying circuit 36 shown in FIG. 1, and represents the total circuitry of the $P_A F_{pv}^2$ circuit 78 shown in FIG. 2. An electrical signal representative of static gauge pressure $P_S$ is applied via conductors 44 and 116 as an input to the amplifier circuit 120 via resistor 119 ($R_1$), and to the voltage divider network comprised of resistors 118 and 108, $R_2$ and $R_3$, respectively.

The circuit is designed for the average specific gravity to be set on the manual potentiometer 108 ($R_3$), although specific gravity could be corrected automatically by use of a conventional function multiplier in place of potentiometer 108. The electrical signal proportional to static pressure $P_S$ is multiplied by the gravity factor $F(G)$ and $F(P)$ by the proper selection of the values of resistors 119, 118, and 108, $R_1$, $R_2$ and $R_3$, respectively. The value of resistors 121 determines the gain of amplifier 120.

The gravity factor $F$ is of the form:

$$F(G) = F(G)\, 3.82G - 1.28 \qquad (10)$$

where:

$F(G)$ = function of gravity earlier defined in equation (6)
$G$ = the specific gravity of the gas In FIG. 5, resistor 118 is sized to form a divider with potentiometer 108, $R_2$ and $R_3$, respectively, such that their division ratio is $F(P)$ multiplied by 3.82. The gain of amplifier 120 is negative and is controlled by the ratio of resistors 119 and 121, resistor 121 having the value $C_1 F(P) R_1$ and $C_1$ equal to 1.28. Accordingly the gain of amplifier 120 is shown by the following equation:

$$\text{Gain} = \frac{C_1 F(P) R_1}{R_1}$$
$$= -1.28 F(P) \qquad (11)$$

The resulting output of the multiplier circuit 100 via conductor 109 is:

$$V_{out} = 3.82 F(P) G P_s - 1.28 F(P) P_s$$
$$= (3.82 G - 1.28) F(P) P_s \qquad (12)$$

and substituting for $F(G)$ as defined in equation (10), $$V_{out} = F(G) F^*P) P_S$$

In multiplier circuit 102, the $F(T)$ values are continuously variable and are applied via conductors 38 from a conventional thermistor transducer circuit 76 (see FIG. 2) and determines the gain of amplifier 122. Thus, the gain of amplifier 122 is directly controlled by the value of $F(T)$, thereby multiplying the input product signal via conductor 109 by the temperature function $F(T)$ which is applied out via conductor 110 as an input to the summing circuit 104. The product term $P_S F(P) F(G) F(T)$ is added to the constant $K_1$ by means of a conventional operational amplifier summing circuit 126. The constant $K_1$ is generated via a source voltage 123 and is preset by potentiometer 124($R_4$). The output of the summing circuit 104 via conductor 40 is $F_{pv}^2 = P_S F(P) F(G) F(T) + K_1$ which is applied as one input to a conventional two-variable multiplying circuit 114.

The signal representative of the static gauge pressure of the gas $P_S$ is also applied via conductor 46 as an input to summing circuit 112. A signal representing pressure $P_B$ is applied via conductor 92 as a second input to summing circuit 112. Summing circuit 112 is a conventional operational amplifier summing circuit for receiving the two inputs $P_S$ and $P_B$ and summing the two quantities to generate an electrical output representative of absolute pressure $P_A$ applied via conductor 115 as a second variable input to the multiplying circuit 114. The absolute pressure $P_A$ and the $F_{pv}^2$ term are multiplied by the conventional multiplying circuit 114 which generates an electrical signal as an output applied via conductor 42 to a gas flow computer as shown in FIGS. 1 and 2 to accomplish the final calculation of gas flow in standard units.

While the detailed schematic portion of the various multiplying and adding circuits in FIG. 5 are further elaboration of the functional schematics shown in FIGS. 3 and 4, the $P_A F_{pv}^2$ circuit 78 as shown in FIG. 2 would include the identical circuitry shown in FIG. 5.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. In apparatus for continuously determining the quantity of natural gas flowing in a pipeline over a preselected range of specific gravity, pressure and temperature utilizing a gas flow computer, the improvement therein for continuously correcting for the supercompressibility of the gas comprising measuring means for continuously measuring the static pressure of the gas and generating a first electrical signal in response thereto, a first multiplying circuit for receiving said first electrical signal and multiplying said signal by predetermined functions of pressure and specific gravity for generating a second electrical signal representative of the product of said static pressure and said predetermined functions of pressure and specific gravity, a second multiplying circuit for receiving said second electrical signal and multiplying said signal by a predetermined function of temperature and generating a third electrical signal representative of the product of said static pressure and said predetermined functions of pressure, specific gravity and temperature, means for producing a fourth electrical signal representative of a first predetermined constant, adding means for receiving said third and fourth electrical signals and summing said signals for producing a fifth electrical signal representative of the squared supercompressibility factor of the gas, means for producing a sixth electrical signal representative of barometric pressure, adding means for receiving and summing said first and sixth electrical signals representative of static pressure and barometric pressure and producing a seventh signal representative of absolute pressure, and a third multiplying circuit for receiving said fifth and seventh signals representative of the squared supercompressibility factor and absolute pressure, multiplying said signals and generating an eighth electrical signal representative of the product of said absolute pressure and squared supercompressibility factor for application to the gas flow computer.

2. The apparatus as described in claim 1, wherein said first multiplying circuit includes
an input voltage divider circuit for receiving said first electrical signal and including a first manual potentiometer, said first manual potentiometer adjustable for causing a voltage drop across said potentiometer representative of the average specific gravity of the natural gas over the preselected range of specific gravity, and
an amplifier circuit connected to said input voltage divider and receiving said first electrical signal, said voltage divider and amplifier circuits cooperating to multiply said first electrical signal by said preselected functions of pressure and gravity and generating said second signal.

3. The apparatus as described in claim 2, wherein said voltage divider has a division ratio equal to a second preselected constant multiplied by said preselected function of pressure.

4. The apparatus as described in claim 2, wherein said amplifier circuit has a gain equal to a third preselected constant multiplied by said preselected function of pressure.

5. The apparatus as described in claim 2, wherein said preselected function of specific gravity is equal to said second preselected constant multiplied by said average specific gravity value entered in said manual potentiometer plus said third preselected constant.

6. The apparatus as described in claim 1, wherein said second multiplying circuit includes an amplifier circuit having a gain varying in direct response to said predetermined function of temperature obtained by a temperature transducer circuit continuously monitoring the temperature of the gas flowing in the pipeline.

7. The apparatus as described in claim 1, wherein said adding means comprises a summing amplifier circuit.

8. The apparatus as described in claim 1, wherein said means for receiving and summing said first and sixth electrical signals representative of static pressure and barometric pressure comprises an input voltage divider network and a summing amplifier circuit.

9. A method of continuously determining a function of the supercompressibility factor of natural gas flowing in a pipeline over a preselected range of specific gravity, pressure and temperature, comprising the steps of
measuring the continuous static pressure of the gas and generating an electrical signal representative thereof,
deriving predetermined functions of pressure, temperature and specific gravity over the preselected range of operation, multiplying said signal representative of the static pressure of the gas by said predetermined functions of pressure, temperature and specific gravity for generating an electrical signal representative of the product $P_S F(P) F(G) F(T)$,
generating an electrical signal representative of a predetermined constant factor valid for the preselected range of pressure, temperature and specific gravity, and
deriving an electrical signal representative of the squared supercompressibility factor of the gas equal to the signal representing the product $P_S F(P) F(G) F(T)$ plus the electrical representative of said derived predetermined constant.

10. The method as described in claim 9, including the further steps of
generating an electrical signal representative of barometric pressure,
deriving an electrical signal representative of absolute pressure of the gas by summing said electrical signals representative of static pressure and barometric pressure, and
deriving an electrical signal representative of the product of said squared supercompressibility factor and said absolute pressure.

11. A method of continuously determining the value of the squared supercompressibility factor of natural gas flowing in a pipeline over a preselected range of specific gravity, pressure and temperature, comprising the steps of
continuously measuring the static pressure of the flowing gas and generating a signal representative thereof,
deriving functions of pressure, temperature and specific gravity over the preselected range of operation,
multiplying said signal representative of the static pressure of the gas by said derived functions of pressure, temperature and specific gravity for generating a signal representative of the product $P_s F(P) F(G) F(T)$,
deriving a constant factor related to the value of the squared supercompressibility factor of the gas at the average of the preselected range of specific gravity, pressure and temperature represented by the equation $K_1 = F_{pv}^2 - P_s F(P) F(G) F(T)$ and generating a signal representative thereof, and
deriving a signal representative of the squared supercompressibility factor of the gas equal to the sum of the signal representing said product $P_s F(P) F(G) F(T)$ and the signal representing said constant factor.

12. A method of continuously determining a function of the supercompressibility factor of natural gas flowing in a pipeline over a preselected range of specific gravity, pressure and temperature, comprising the steps of
continuously measuring the static pressure of the flowing gas and generating a signal representative thereof,
deriving functions of pressure, temperature and specific gravity over the preselected range of operation,
multiplying said signal representative of the static pressure of the gas by said derived functions of pressure, temperature and specific gravity for generating a signal representative of the product $P_sF(P)F(G)F(T)$, deriving a constant factor related to the value of the squared supercompressibility factor of the gas at the average of the preselected range of specific gravity, pressure and temperature represented by the equation $K_1 = F_{pv}^2 - P_sF(P)F(G)F(T)$ and generating a signal representative thereof, deriving a signal representative of the squared supercompressibility factor of the gas equal to the sum of the signal representing said product $P_sF(P)F(G)F(T)$ and the signal representing said constant factor, continuously measuring barometric pressure and generating a signal representative thereof, deriving a signal representative of absolute pressure of the gas by summing said signals representative of static pressure of the gas and barometric pressure, and deriving a signal representative of the desired function of the supercompressibility factor by multiplying said signals representative of the squared supercompressibility factor and absolute pressure.

13. Apparatus for continuously determining a function of the supercompressibility factor of natural gas flowing in a pipeline over a preselected range of specific gravity, pressure and temperature, comprising means for continuously measuring the static pressure of the gas and generating a first signal in response thereto, means for continuously measuring the temperature of the gas and generating a second signal representative of a predetermined function of said measured temperature for the preselected ranges of specific gravity, pressure and temperature, first circuit means receiving said first and second signals and generating a third signal representative of the product of said first and second signals and predetermined functions of pressure and specific gravity for the preselected ranges of specific gravity, pressure and temperature, said third signal being representative of the product $P_sF(P)F(G)F(T)$, means for generating a fourth signal representative of a constant factor related to the squared value of the supercompressibility factor of the gas at the average of the preselected ranges of specific gravity, pressure and temperature represented by the equation $K_1 = F_{pv}^2 - P_sF(P)F(G)F(T)$, and second circuit means for summing said third and fourth signals and generating a fifth signal representative of the desired function of the supercompressibility factor of the gas.

14. The apparatus as described in claim 13, wherein said first circuit means comprises an input voltage divider circuit for receiving said first signal and including a manual potentiometer, said potentiometer adjustable to a resistive value representative of the average specific gravity of the natural gas, said voltage divider having a division ratio equal to a first preselected constant multiplied by said preselected function of pressure, an amplifier circuit having a gain equal to a second preselected constant multiplied by said predetermined function of pressure, said voltage divider and amplifier circuits cooperating to multiply said first signal representative of static pressure by said preselected functions of pressure and gravity, and an amplifier circuit the gain of which varies in direct response to said second signal representative of said predetermined function of temperature.

15. Apparatus as described in claim 14, wherein said preselected function of gravity is equal to said first preselected constant multiplied by said average gravity resistive value entered in said manual potentiometer plus said second preselected constant.

16. The apparatus as described in claim 13, wherein said means for generating said fourth signal includes
a source of positive dc voltage, and
a manual potentiometer connected to said source of positive dc voltage for adjusting the voltage drop across the potentiometer to equal said constant factor.

17. The apparatus as described in claim 13, wherein said second circuit means comprises a summing amplifier for receiving and summing said third and fourth signals.

18. The apparatus as described in claim 13, further including
means for continuously measuring barometric pressure and generating a sixth signal in response thereto,
means for receiving said first and sixth signals representative of said static pressure of the gas and barometric pressure and summing said signals to produce a seventh signal representative of the absolute pressure of the gas, and
third circuit means receiving said fifth and seventh signals and generating an eighth signal representative of the desired function of the squared supercompressibility factor obtained as a product of said fifth and seventh signals.

19. The apparatus as described in claim 18, wherein said means for receiving and summing said first and sixth electrical signals comprises a summing amplifier circuit.

20. Apparatus for continuously determining a function of the squared supercompressibility factor of natural gas flowing in a pipeline over a preselected range of specific gravity, pressure and temperature, comprising means for continuously measuring the static pressure of the gas and generating a first signal in response thereto, means for continuously measuring the temperature of the gas and generating a second signal representative of a predetermined function of said measured temperature for the preselected ranges of specific gravity, pressure and temperature, first circuit means receiving said first and second signals and generating a third signal representative of the product of said first and second signals and predetermined functions of pressure and specific gravity for the preselected ranges of specific gravity, pressure and temperature, said third signal being representative of the product $P_sF(P)F(G)F(T)$, means for generating a fourth signal representative of a constant factor related to the squared value of the supercompressibility factor of the gas at the average of the preselected ranges of specific gravity, pressure and temperature represented by the equation $K_1 = F_{pv}^2 - P_s F(P)F(G)F(T)$, second circuit means for summing said third and fourth signals and generating a fifth signal representative of the squared supercompressibility factor of the gas, means for continuously measuring barometric pressure and generating a sixth signal in response thereto, means for receiving said first and sixth signals representative of said static pressure of the gas and barometric pressure and summing said signals to produce a seventh signal representative of the absolute pressure of the gas, and third circuit means receiving said fifth and seventh signals and generating an eighth signal representative of the desired function of the squared supercompressibility factor obtained as a product of said fifth and seventh signals.

* * * * *